(12) United States Patent
Till et al.

(10) Patent No.: US 11,814,140 B2
(45) Date of Patent: Nov. 14, 2023

(54) ADJUSTABLE MARINE FENDER HOLDER

(71) Applicant: Silver Fox Capital, Dallas, TX (US)

(72) Inventors: Adam Ryan Butler Till, Dallas, TX (US); Walter John Till, Darien, CT (US)

(73) Assignee: SILVER FOX CAPITAL, Dallas, TX (US)

( * ) Notice: Subject to any disclaimer, the term of this patent is extended or adjusted under 35 U.S.C. 154(b) by 282 days.

(21) Appl. No.: 17/239,919

(22) Filed: Apr. 26, 2021

(65) Prior Publication Data

US 2022/0340238 A1    Oct. 27, 2022

(51) Int. Cl.
*B63B 21/04*    (2006.01)
*B63B 59/02*    (2006.01)

(52) U.S. Cl.
CPC .............. *B63B 21/04* (2013.01); *B63B 59/02* (2013.01)

(58) Field of Classification Search
CPC ................................ B63B 21/04; B63B 59/02
See application file for complete search history.

(56) References Cited

U.S. PATENT DOCUMENTS

| | | | | |
|---|---|---|---|---|
| 6,695,688 B1 * | 2/2004 | Owen | ...................... | A22B 5/06 452/187 |
| 6,840,186 B1 * | 1/2005 | Steele | .................. | B63B 21/045 182/92 |
| 7,775,176 B2 * | 8/2010 | Abel | ....................... | B63B 59/02 114/364 |
| 8,087,371 B1 * | 1/2012 | Sadegh | ................... | B63B 59/02 114/220 |
| 2008/0006195 A1 * | 1/2008 | Abel | ....................... | B63B 59/02 114/219 |
| 2011/0312259 A1 * | 12/2011 | Ugiansky | ................. | A22B 5/06 452/187 |
| 2022/0169340 A1 * | 6/2022 | Vanberg | .................. | B63B 21/00 |

FOREIGN PATENT DOCUMENTS

EP      1353089 A2 *   10/2003            F16G 11/02

* cited by examiner

*Primary Examiner* — S. Joseph Morano
*Assistant Examiner* — Jovon E Hayes
(74) *Attorney, Agent, or Firm* — Ulmer & Berne LLP

(57) ABSTRACT

Varying implementations of adjustable marine fender holders are disclosed, which may receive a length of rope and hold it in place so that a marine fender may be adjusted to a desired height and then fixed in place without having to untie or retie the length of rope. Holders include a friction fit feature for engaging with a nautical cleat, and a rope channel through which a rope may be passed so that a proximal end of the rope may be wedged into a set of teeth or ridges to hold the rope in place. Another holder includes a single wedged arm that may be wedged underneath a cross bar of a cleat. Yet another holder includes a collapsible friction pad that may be wedged into a cleat. Yet another holder includes a compressible friction pad that may be wedged into a cleat.

15 Claims, 16 Drawing Sheets

ADJUSTABLE MARINE FENDER HOLDER

FIELD

The disclosed technology pertains to variations of adjustable marine fender holders.

BACKGROUND

Boats can suffer significant damage from impacts with docks or other structures both while being operated and while being stored in place. Low speed impacts can occur during docking procedures, and gradual wear can occur from repeated contacts with a dock caused by the natural motion of waves which affect the boat. Over time, these impacts and gradual wear can cause aesthetic damage (e.g., scratches, scuffs, damage to painted surface) and structural damage, especially where the boat is subjected to rough waves during storage.

Typically a boat owner will place marine fenders between the boat and a nearby structure in order to absorb and prevent direct contact between the boat and structure. Marine fenders are typically made of soft and flexible materials such as rubber, and may contain hollow interiors or other flexible structures to aid in absorbing impacts. While marine fenders are effective, they can be difficult to position and maintain over time. Typically a marine fender is couple to a length of rope, positioned at a desired height along the boat, and then the proximal end of the rope is tied to a cleat, post, or other structure of the boat.

Positioning marine fenders in this manner is disadvantageous in that it requires frequent, repetitive, tying and untying of the rope to change the height and positon of the fender. As the local water level changes, so too will the height at which a hull of the boat would contact a stationary structure, and each docking structure may have different heights relative to the water line, and so the height of a fender may be adjusted multiple times per day due to docking at different structures and/or changes in weather. Fenders may also need to be rapidly adjusted in some situations, such as during a docking procedure where a pilot is positioning and adjusted fenders during approach to a structure based upon their estimated contact height with a hull of the boat.

What is needed, therefore, is an improved holder for positioning marine fenders.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

The inventors have conceived of novel technology that, for the purpose of illustration, is disclosed herein as applied in the context of marine fender holders. While the disclosed applications of the inventors' technology satisfy a long-felt but unmet need in the art of m, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

The inventors have conceived of novel technology that, for the purpose of illustration, is disclosed herein as applied in the context of an adjustable marine fender holder. While the disclosed applications of the inventors' technology satisfy a long-felt but unmet need in the art of adjustable marine fender holders, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

Figure 1:
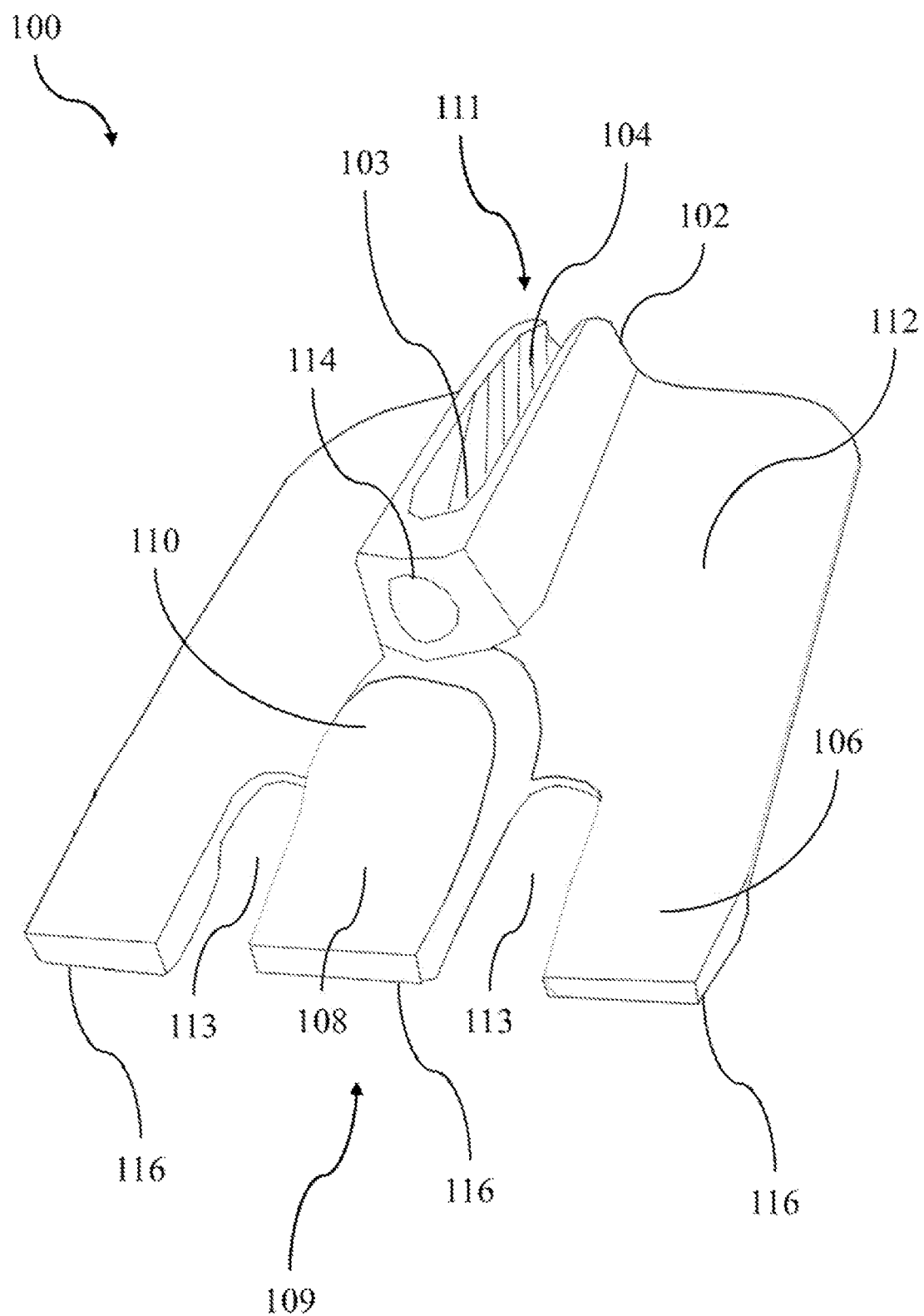
FIG. 1 is a front perspective view of an exemplary adjustable marine fender.
Figure 3:
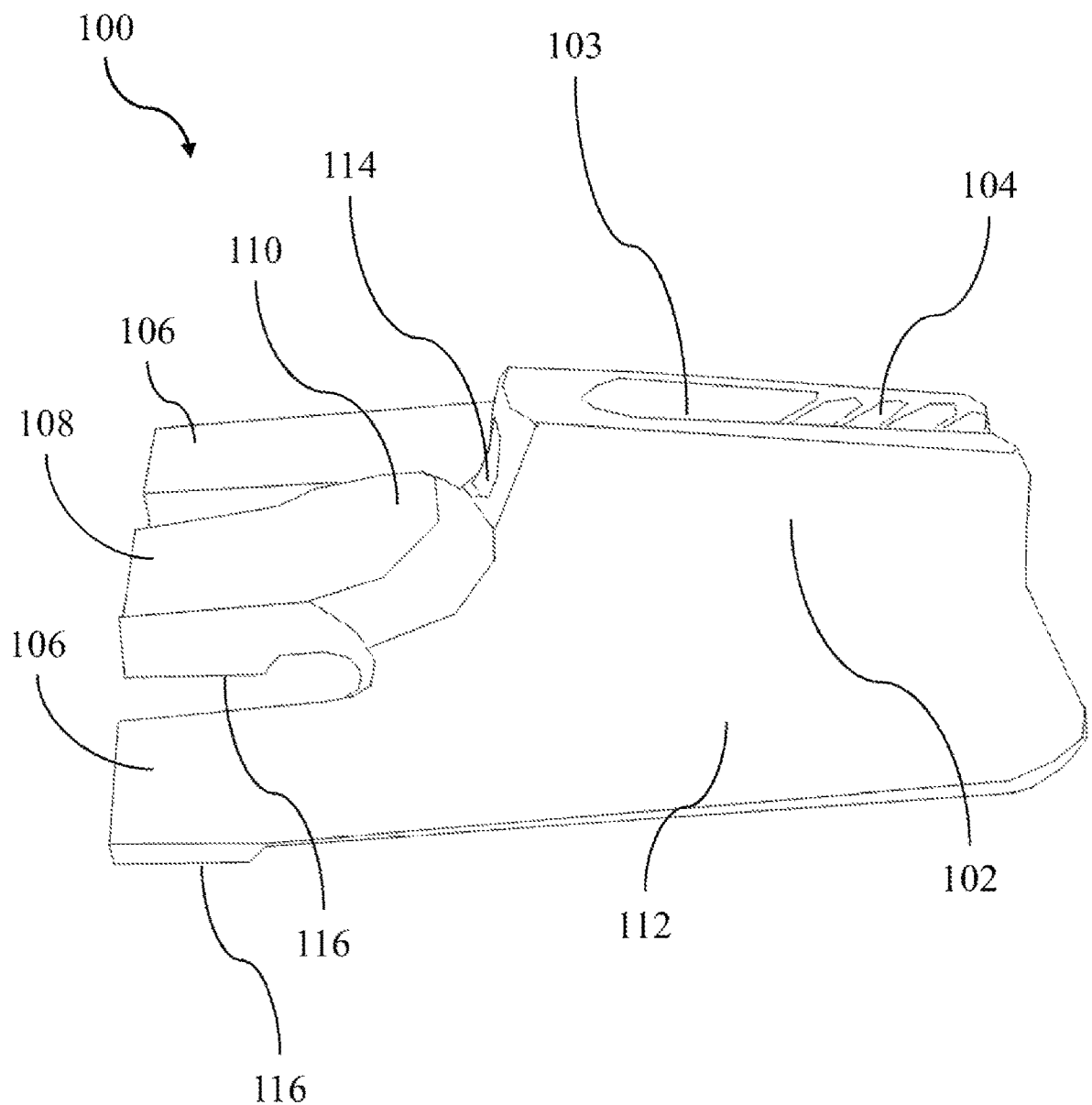
FIG. 3 is a side perspective view of the exemplary adjustable marine fender holder of FIG. 1.

Turning now to the figures, FIG. 1 is a front perspective view of an exemplary adjustable marine fender holder (100). The shown holder (100) is generally flat across the body (112), with the body (112) having outer arms (106), as can also be seen in FIG. 3, and an inner arm (108) that is thicker and gradually slopes upwards to form an arm wedge (110).

The arms (106, 108) extend from the front (109) of the holder (100). Between the outer (106) and inner (108) arms are disposed gaps (113) that run the length of the arms (106, 108). A rope jam (102) extends upwards from the body (112) and is positioned between the outer arms (106) and substantially aligned with the inner arm (108). The rope jam (102) has a hole (114) through which a rope may passed, with the entrance of the hole (114) being on the exterior of the rope jam (102) just behind and above the arm wedge (110) and the exit of the hole (114) opening to a channel (103) that passes lengthwise through the rope jam (102) and ending at the rear (111) of the holder (100). In some embodiments, the channel (103) may be parallel to the body (112), but it should be understood that the channel (103) could also run along the body (112) at an ascending angle or descending angle, as may be desired to facilitate pulling of the rope downwards into the channel (103) in certain applications.

The rope jam also has a plurality of teeth (104) or ridges disposed along the channel (103), such that a rope that passes through the hole (114) and into the channel (103) may be pulled downwards and gripped in place by the plurality of teeth (104), preventing further horizontal movement within the channel and controlling the length of rope that extends from the hole (114). As shown, the teeth (104) are positioned on opposing vertical walls that define a portion of channel (103). The teeth (104) may extend as unbroken ridges upwards from the bottom of the channel (103) as is pictured, but could in some embodiments be, for example, dimples, spikes, or columns protruding from a vertical wall of the channel (103), ridges extending from the channel (103) at various angles, ridges that curve upwards from the bottom of the channel (103), and other configurations that will be apparent to one of ordinary skill in the art in light of this disclosure. The teeth (104) may also be arranged in other desired patterns such as opposing each other, being offset, or being staggered, so long as they provide sufficient friction to hold a rope in place. The teeth (104) may be made of the same material as the holder (100) itself, or may be made of rubber or a soft plastic as may be desired to increase the potential grip strength of the teeth (104) against a rope.

Figure 4:
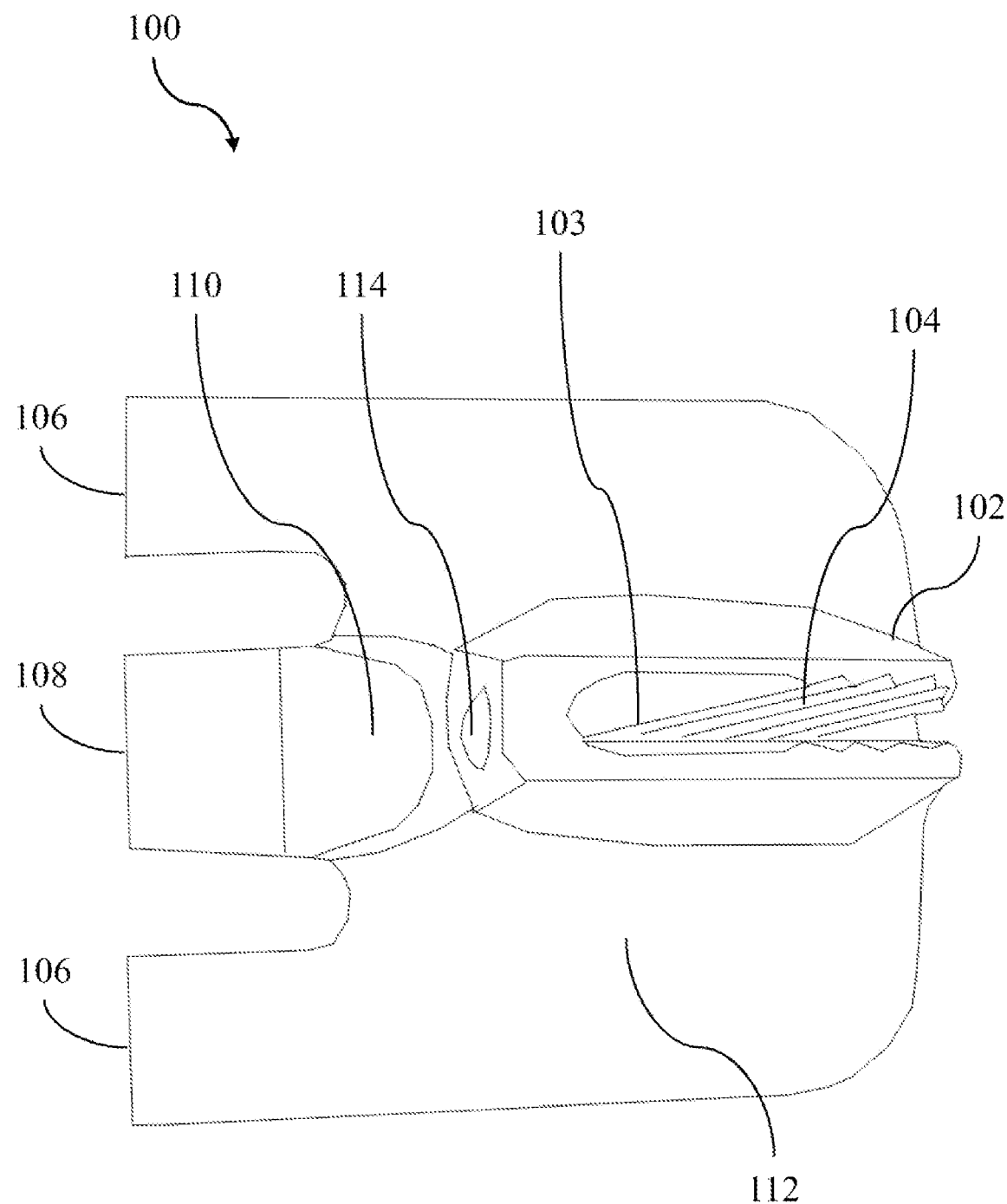
FIG. 4 is a top plan view of the exemplary adjustable marine fender holder of FIG. 1.
Figure 5:
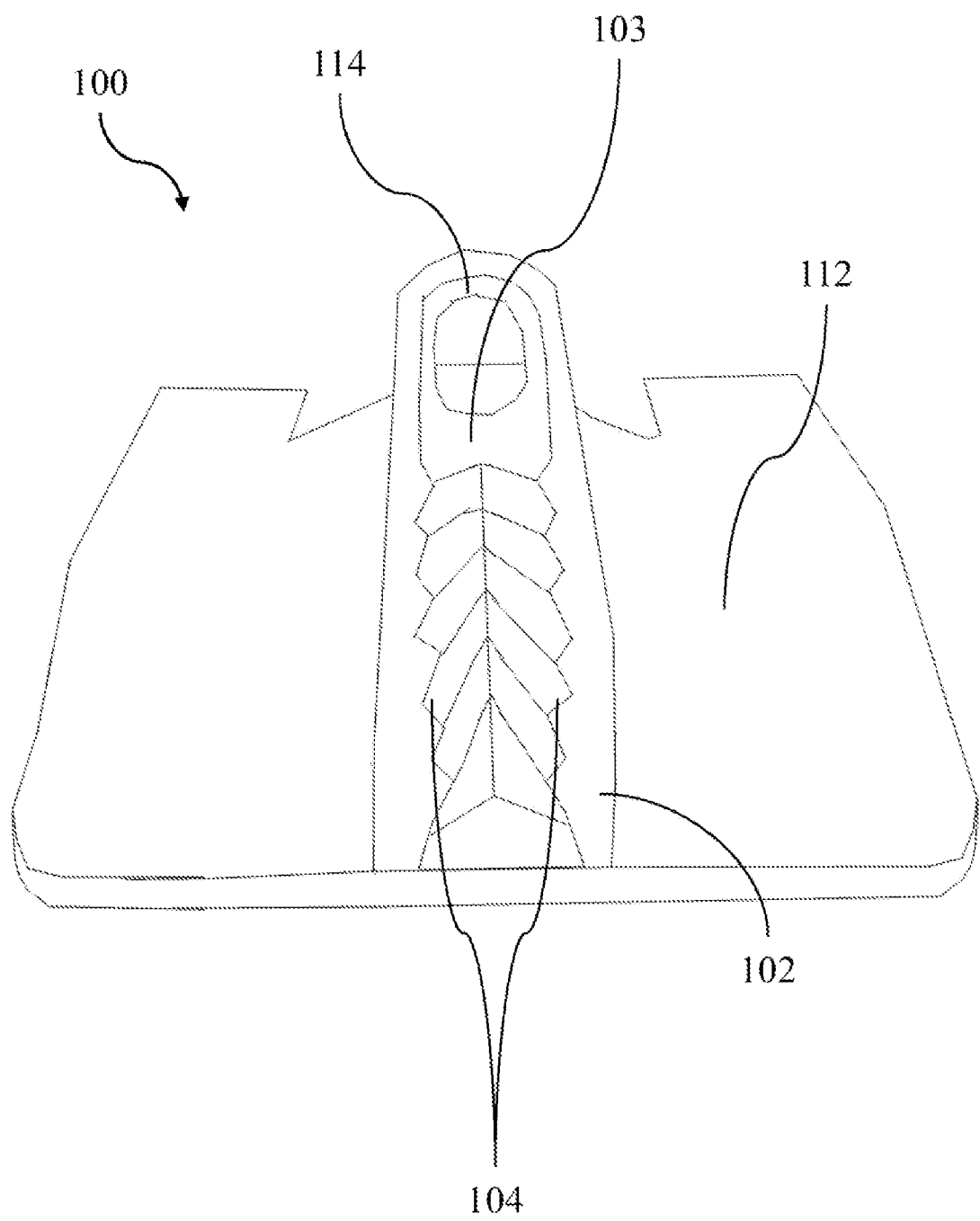
FIG. 5 is a rear perspective view of the exemplary adjustable marine fender holder of FIG. 1.

FIG. 4 shows the holder (100) from above, where it can be seen that a rope passing through the hole (114) will immediately enter the channel (103) and, if pulled downwards and into the channel (103) from the rear of the holder (100) will pass into and engage the teeth (104). As a result, the teeth (104) will compress the rope, thereby holding the rope in place. FIG. 5 shows the holder (100) from the rear, where the plurality of teeth (104) can be clearly seen. As can be seen, the channel (103) is widest at its outer edge where two opposing teeth (104) are furthest apart, and narrowest at the inner edge near the body (112) where two opposing teeth (104) are closest together. The channel (103) may be tapered horizontally from the front (109) to the rear (111) of the holder, vertically from the bottom to the top of the channel (103), or varying degrees of both. This allows for ropes of various materials and diameters to be pulled downwards into the channel (103) until tight, as the rope will be progressively compressed into the channel (103) between the narrowing teeth (104).

Figure 2:
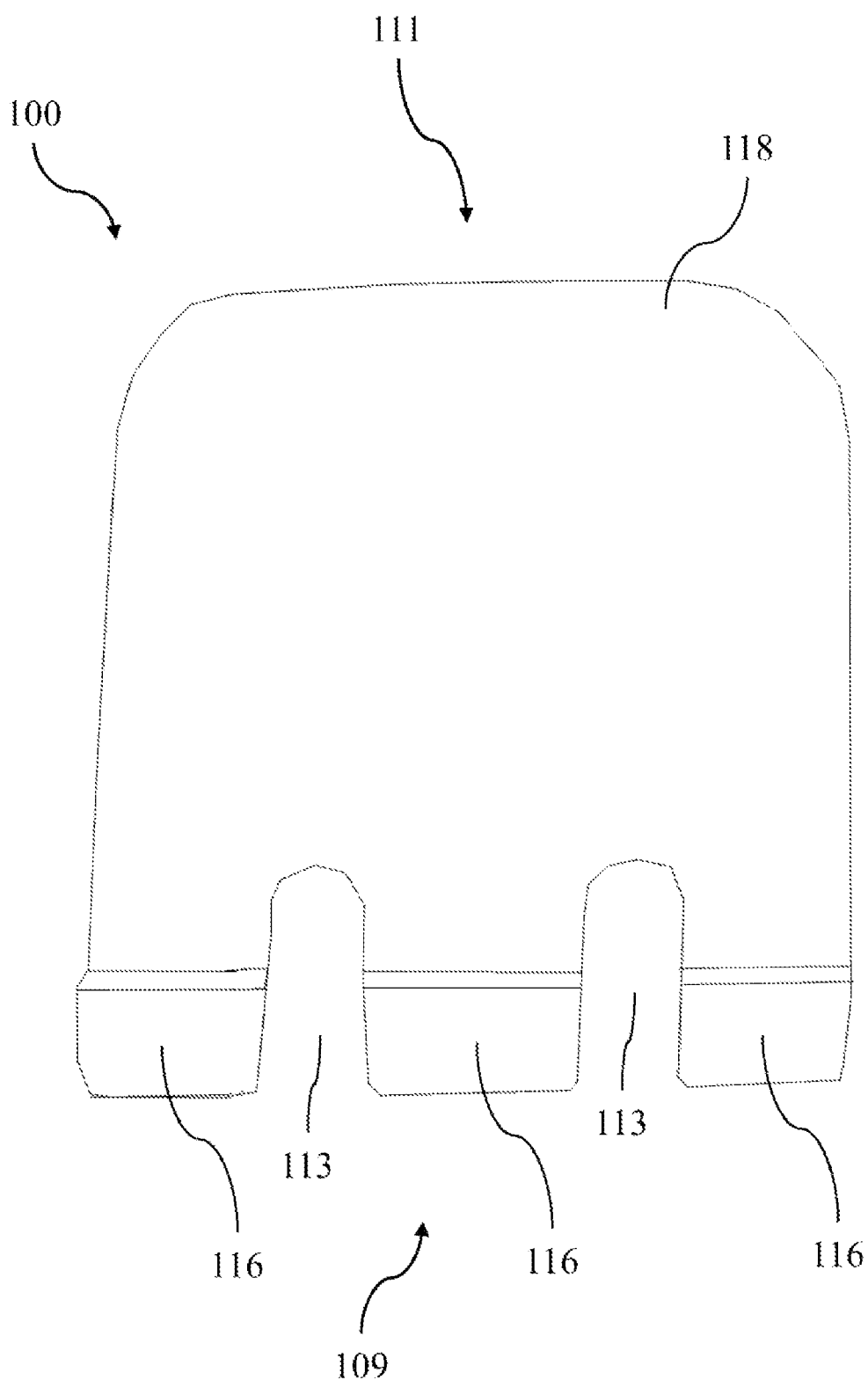
FIG. 2 is a bottom plan view of the exemplary adjustable marine fender holder of FIG. 1.
Figure 6:
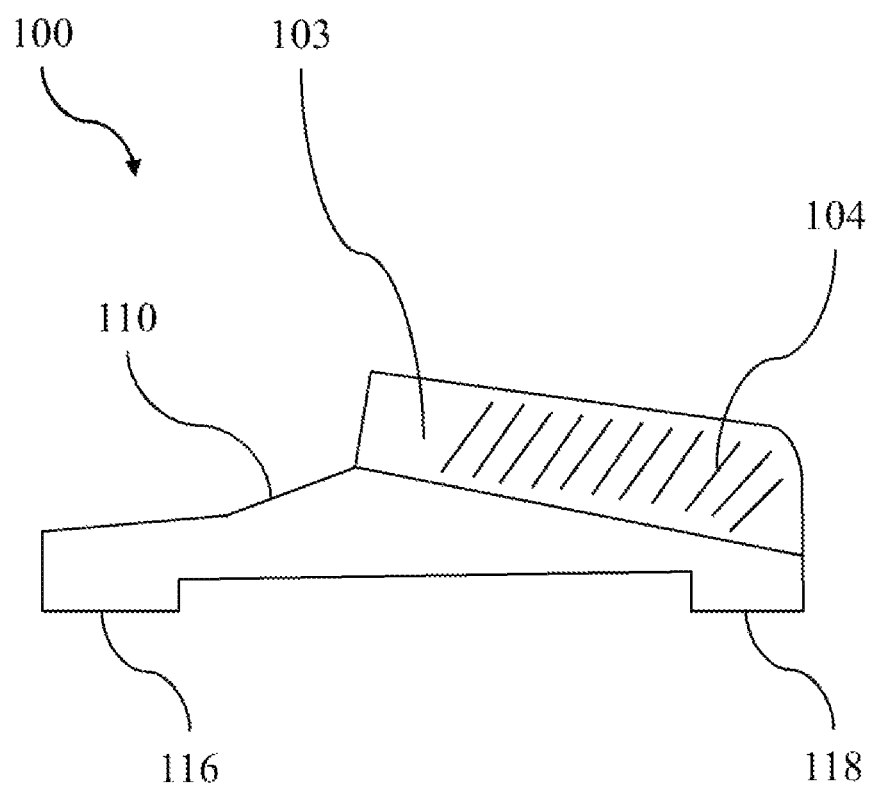
FIG. 6 is a cross sectional side elevation view of the exemplary adjustable marine fender holder of FIG. 1 showing the raised feet.

As can be seen in FIG. 2, the bottom of the holder (100) comprises feet (116) on the front end under each arm as well as a ridge (118) along the rear. The bottom surface is generally flat between the feet (116) and the ridge (118), but may also have a slight curvature. The feet (116) and ridge (118) raise the holder (100) and allow for some flexibility along the body of the holder (100) as the holder is wedged into a cleat, which allows for a tighter engagement and reduces the likelihood that the holder (100) will come free of the cleat. FIG. 6 shows a cross sectional side schematic view of the holder (100) taken along the center of the holder (100). As can be seen, the feet (116) and ridge (118) create a raised area under the holder (100) that may act somewhat like a spring, in that it will allow the body (112) to flex slightly as it is engaged and prevent it from slipping out easily. The feet (116) and ridge (118) may in some embodiments be made of the same material as the body (112) and the rest of the holder (100), or may be, for example, separate pieces that are applied or adhered to the underside of the body (112). This allows for a variety of materials to be used to achieve the desired level of engagement between the holder (100) and the cleat (124).

Figure 7:
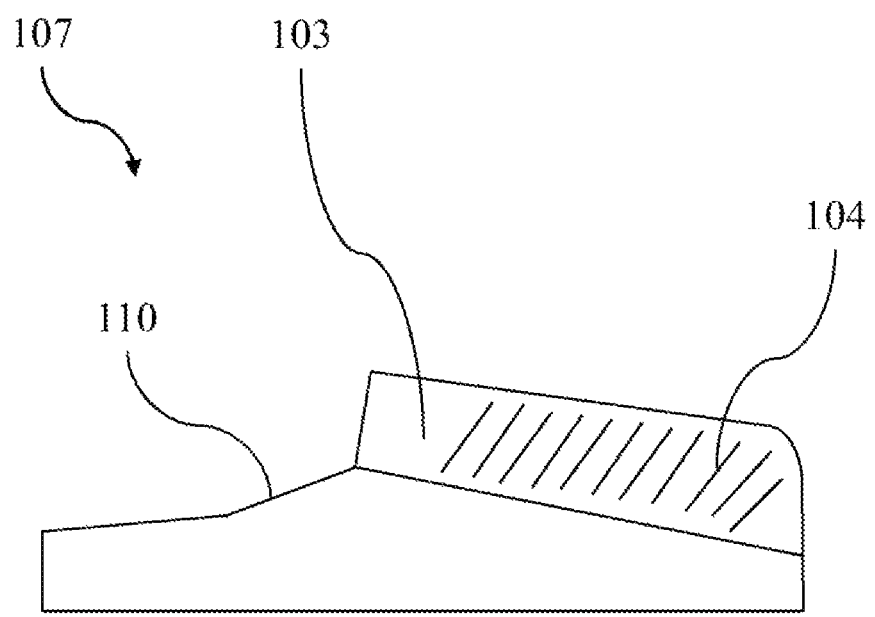
FIG. 7 is a cross sectional side elevation view of an exemplary adjustable marine fender holder with a flat bottom.

For example, a friction pad or compressible rubber foot could allow for a very tight fit when engaged, while a hard or smooth plastic could allow for a looser fit that is more easily removed. It should be understood that the feet (116) and ridge (118) are not necessary and may not be present in some embodiments. For example, FIG. 7 shows an alternate embodiment of a holder (107) having a completely flat bottom. Such a holder (107) could still be engaged with a cleat and, depending upon the material it is constructed from and other factors achieve a varying level of engagement. For example, a holder (107) made of a softer plastic or rubber, or having a high friction or flexible coating along the bottom, could allow for a tight engagement to the cleat even along a flat bottom such as that shown in FIG. 7.

Figure 8:
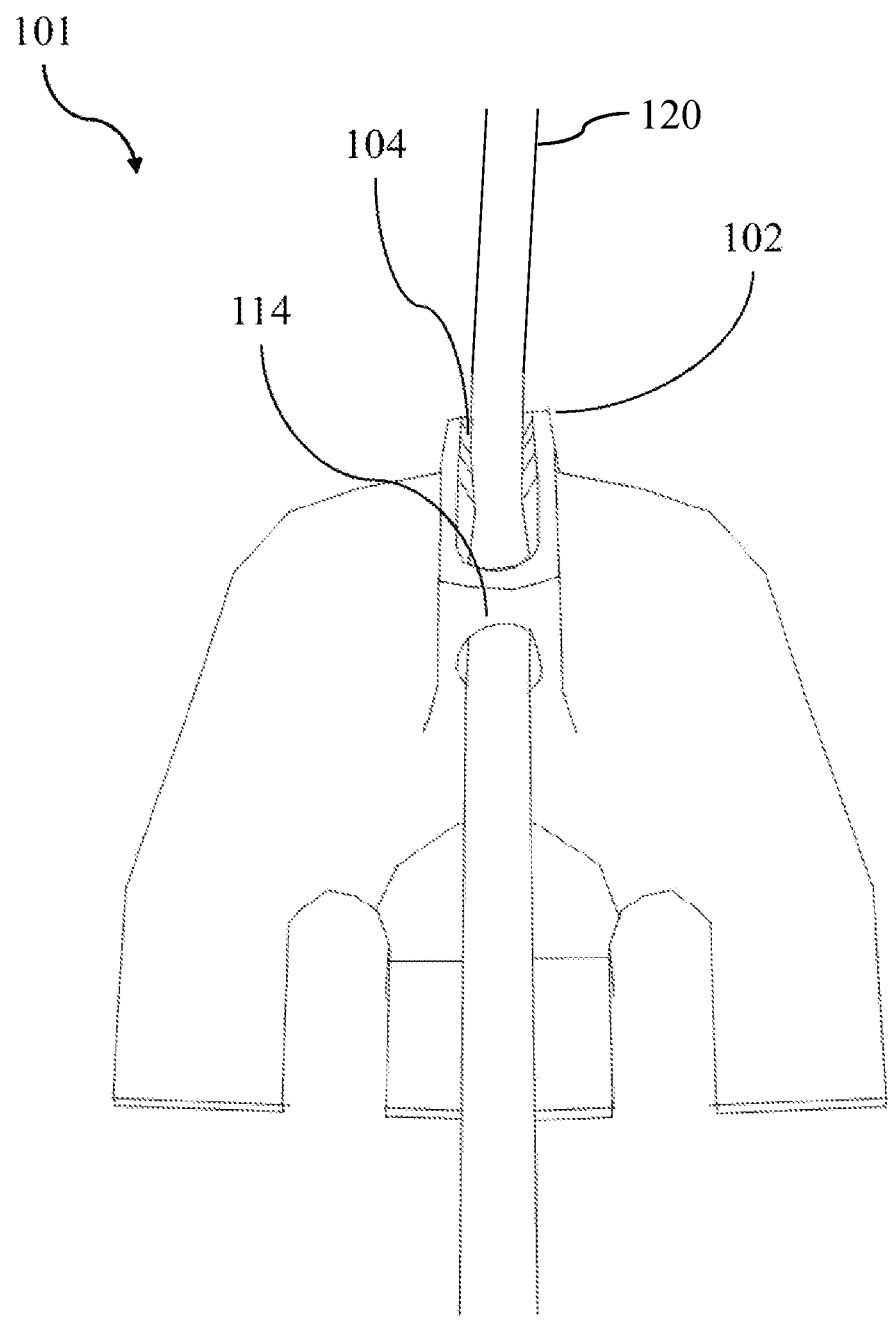
FIG. 8 is a front perspective view of an alternate exemplary adjustable marine fender holder with a rope fixed within a rope jam.

FIG. 8 is a front perspective view of an exemplary adjustable marine fender holder with a rope (120) fixed within the teeth (104) of a rope jam (102). As shown in FIG. 8, the rope (120) is pulled down into the teeth (104) of the holder (101) preventing horizontal movement within the channel (103), thereby preventing a change in the length of the rope (120) that extends outwards from the hole (114).

While FIG. 1 shows one shape that the holder (100) could take, it should be understood that features such as overall shape, curvature, thickness, width, length, and the like may be varied in order to produce a holder (100) having the desired characteristics. A further example, thickness of the body (112), arms (106, 108), feet (116) and ridge (118) may be increased in order to create a heavier and more durable holder (100), or may be decreased to create a lighter and less expensive holder (100). Similarly, the size of the gaps (113) between the arms (106, 108) may be increased or decreased in order to allow the holder (100) to be used with cleats (120) having posts of various sizes, and the number of arms (106, 108) may be increased or decreased in order to allow the holder (100) be used with cleats having differing numbers of posts. Similarly, the size or shape of the hole (114), channel (103), and teeth (104) may be varied or altered to allow for ropes (120) of various sizes to be used with the holder (100). By varying such features, it will be clear to one of ordinary skill in the art that this disclosure contemplates that a holder (100) could be used for many different applications varying from a very light duty holder (100) to be used to hang a small fender from a single-post or short length cleat using a thin rope (120) to a larger heavy duty holder (100) to be used to hang one or more heavy fenders from a long multi-post cleat with a thick rope (120).

Figure 9:
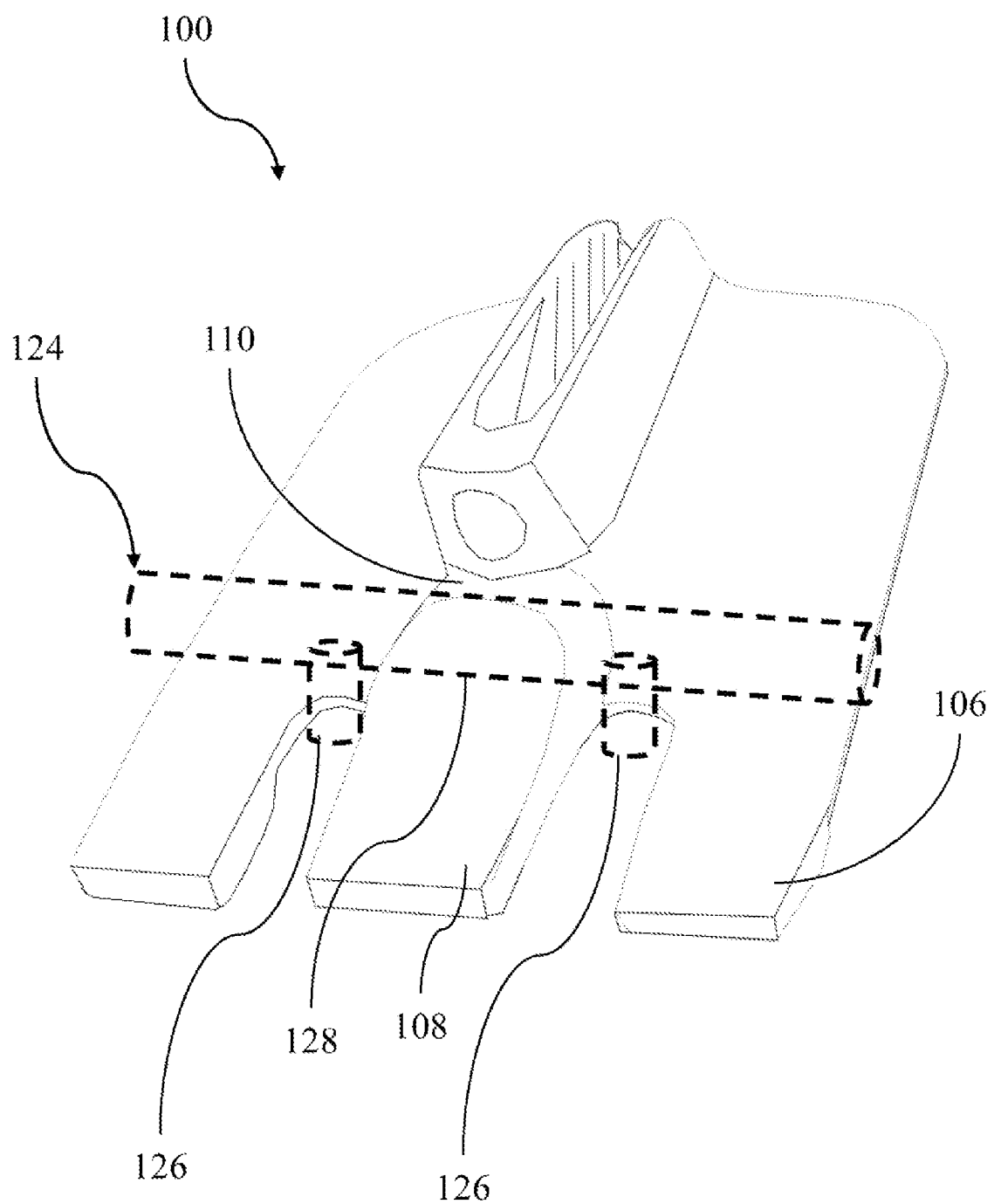
FIG. 9 is a perspective view of an adjustable marine fender holder engaged with a nautical cleat.

FIG. 9 shows the adjustable marine fender holder (100) engaged with a nautical cleat (124), which is illustrated as dashed lines for visibility. In the shown figures, the cleat (124) comprises a horizontal cross bar (128) mounted on two vertical posts (126), so that the horizontal cross bar (128) is raised above a surface. The holder (100) may be wedged into the cleat (124) such that posts (126) rest in the gaps (113) between the arms (106, 108) of the holder (100). As the holder (100) is engaged with the cleat (124) in this manner, the arm wedge (110) portion of the holder (100) comes into contact with a horizontal cross bar (128) and begins to apply a progressive downward force to the holder (100) as it continues to slide forward due to the upward curved or angled slope of the arm wedge (110). When the holder is engaged the cleat (124) will be pushing down against the holder (100) at the point where the arm wedge (110) and horizontal cross bar (128) meet, which will increase the downward force and resulting friction of the holder (100) against the surface it rests upon. This force, combined with others such as, for example, the weight of a hanging fender (130) pulling the holder (100) forward and downward against the cleat (124), any flex within the body (112) resulting from the engaged state that the holder (100) is in, and any additional frictional forces from coatings, pads, or other such features of the underside of the holder (100) pressing against the mounting surface serve to keep the holder (100) engaged with the cleat (124) during use.

The holder (100) may be constructed of different materials or constructed in different ways as may be suitable for a particular purpose. For example, in some embodiments, the holder (100) may be a single piece of plastic, thermoplastic resin, polymer, or metal, and may be solid throughout in order to increase weight and durability or may have some hollow portions in order to decrease weight, allow more flexibility along the body (112) of the holder (100), or to float in water. In other embodiments, the holder (100) may be constructed of separate pieces, such as where the body (112) may be a single piece that is attached or adhered to the feet (116) and the rope jam (112), which may allow for construction from several different types of materials (e.g. a plastic body (112) and rubber feet (116) or arm wedges (110)) that may allow for a tighter wedge of the holder (100) against the cleat (124) or the rope (120) within the teeth (104). As has been previously described, the overall shape of the holder (100) may be varied to allow attachment with a variety of cleats having different sizes and characteristics, but may additionally be varied in shape to allow for an ornamental shape of the holder (100), to allow for a handle or grip to extend from the holder (100) to aid in engaging and removing the holder (100) from a cleat (124), to allow for a kick-plate that may be used with a foot to wedge the holder (100) and other variations to shape and size.

Other variations exist and will be apparent in light of this disclosure. For example, some embodiments may have less than three arms (106, 108), or may have an arm wedge (110) on each arm or on a different arm or arms from the inner arm (108). Some embodiments may have a rope jam (102) mounted perpendicular to the length of the holder, or mounted on a swiveling portion that allows for flexibility in placing a fender at the corner of a boat or dock. Some embodiments may have a movable locking member that latches across the ends of the arms (106, 108) and provides an additional safeguard against accidental removal of the holder (100) from the cleat, or a locking member that latches over top of channel (103) to provide an additional safeguard against accidental removal of the rope (120) from the channel.

Figure 10:
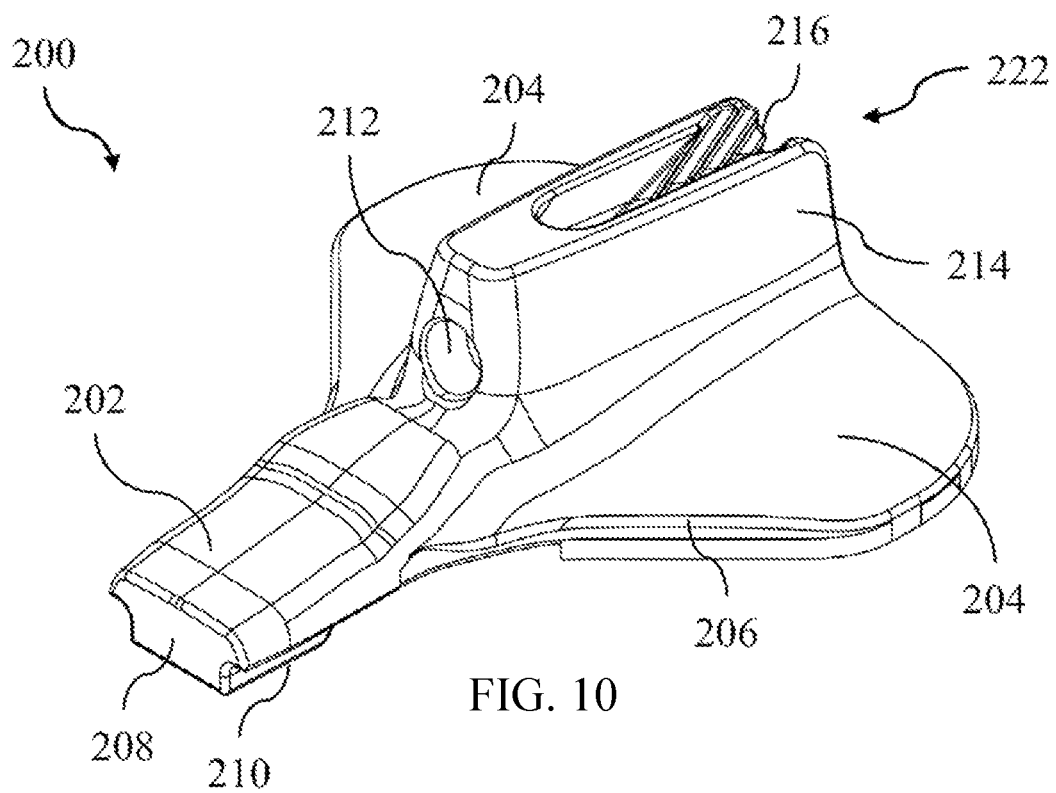
FIG. 10 is a front perspective view of an alternate adjustable marine fender holder that may be engaged with a nautical cleat.

As an example of alternate implementation, FIGS. 10-15 show views of an alternate adjustable marine fender holder (200) that incorporates at least some of the features and characteristics described above in relation to the holder (100). With reference to FIG. 10, it can be seen that the holder (200) includes a wedged arm (202) similar to the inner arm (108) and arm wedge (110). In particular, a tip (208) of the wedged arm (202) may be inserted into a gap of a nautical cleat and as the holder (200) is engaged with the cleat the wedged arm (202) and foot (210) will provide a friction fit against the nautical cleat, holding the holder (200) in place. As with the holder (100), achieving a friction fit with the nautical cleat may also include implementing compressible materials, high friction materials, mechanical holds or catches, or other features on the holder (200), such as on the wedged arm (202) and foot (210).

Figure 12:
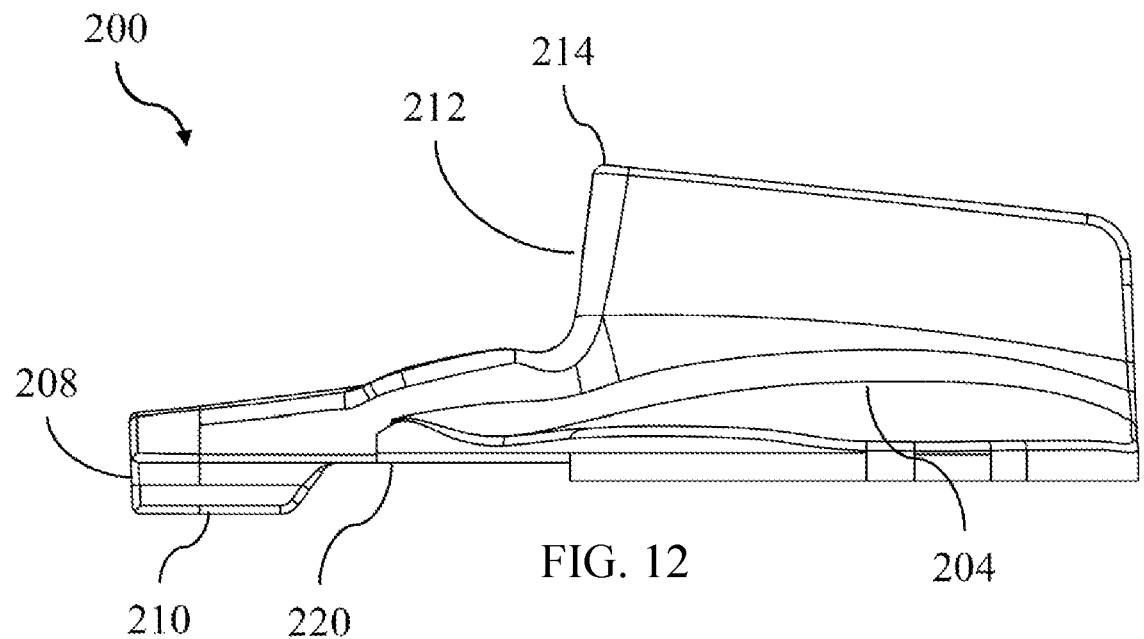
FIG. 12 is a side elevation view of the adjustable marine fender holder of FIG. 10.

With reference to FIG. 12, a flex member (220) can be seen as part of the holder (200) body, which may be a semi-rigid material that allows at least a degree of flexibility in the body of the holder (200). When the holder (200) is inserted into a cleat, the body may flex along the flex member (220) to assist with achieving a tight friction hold against the nautical cleat. In this manner, the holder (200) may be inserted into the cleat until either the wedged arm (202) contacts the cleat and an adequate friction grip is achieved, or until a contoured edge (206) of a wing portion (204) of the holder contacts the cleat and prevents further insertion, or both. The contoured edge (206) prevents overs insertion of the holder (200) into a cleat, which may result in an excessive friction fit that is difficult to disengage, or may result in the tip (208) over extending past the cleat (e.g., such as into free space over the edge of the boat where it is unsupported by the structure of the boat), or both. As will be apparent to one of ordinary skill in the art in light of this disclosure, the shape and dimensions of the foot (210), wedged arm (202), contoured edges (206), and other features of the holder (200) may be varied to accommodate a wide range of nautical cleats having varying numbers of posts, post sizes, cleat heights, and other characteristics.

Figure 11:
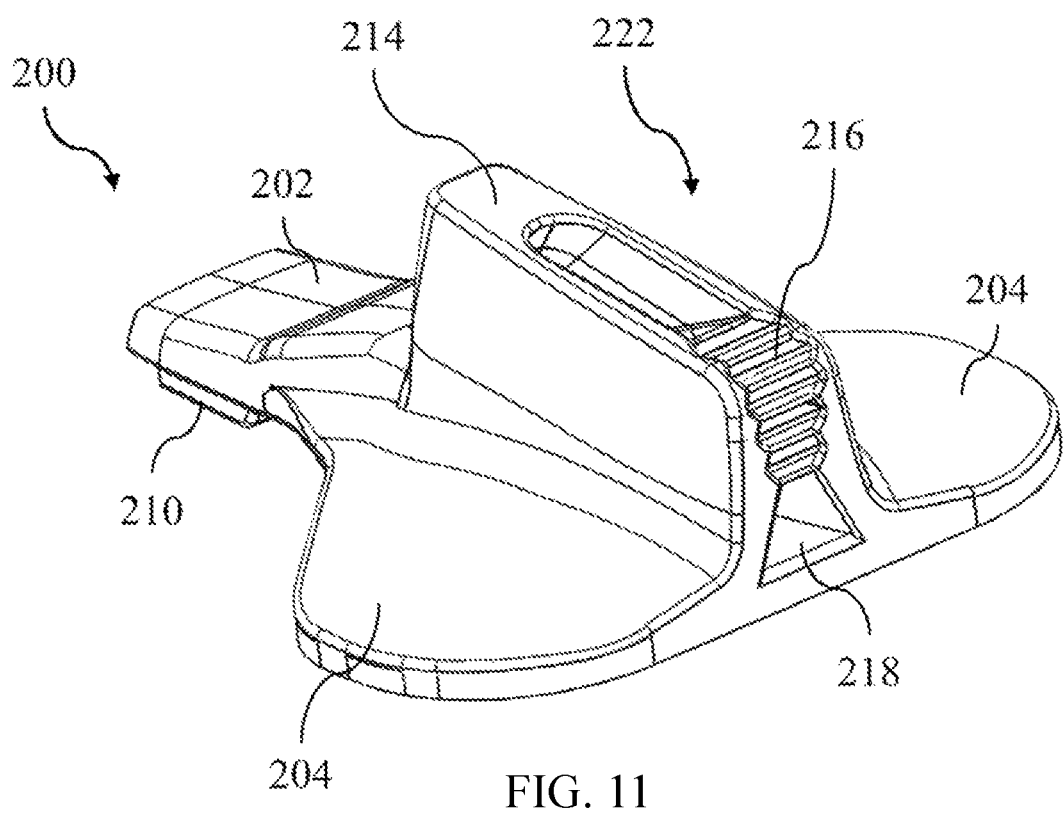
FIG. 11 is a rear perspective view of the adjustable marine fender holder 10.

With reference to FIG. 11, a rope jam (214) having use and characteristics similar to the rope jam (102) can be seen rising from the body of the holder (200). The rope jam (214) may be used similarly to the rope j am (102) as described elsewhere. The rope jam (214) includes a set of teeth (216) and a catch (218) that define a rope channel (222) passing through the rope jam (214) and exiting through a hole (212). Ropes of various diameter, material, and compressibility may be passed through the rope channel (222) with a distal end passing through the hole (212) in the direction of the tip (208) and a proximal end being wedged into the teeth (216) and the catch (218) to achieve a friction fit and prevent the rope from sliding free of the rope channel (222) due to the weight of a marine fender attached to the distal end. As with prior examples, the size, shape, and other characteristics of the hole (212), the rope channel (222), the set of teeth (216), the catch (218), and other aspects of the rope jam (214) may be varied to accommodate cleats of different sizes and characteristics.

Figure 15:
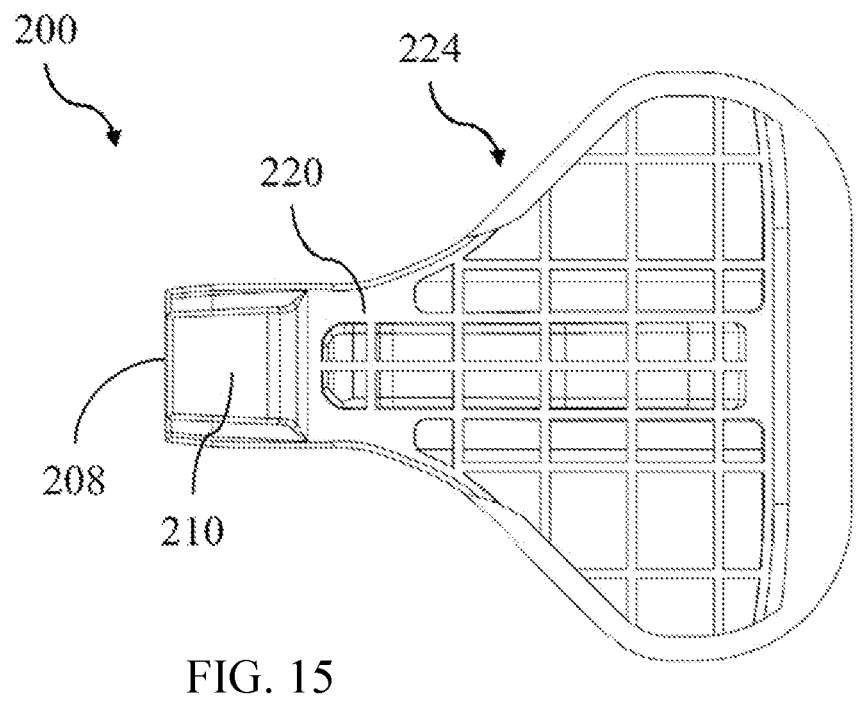
FIG. 15 is a bottom view of the adjustable marine fender holder of FIG. 10.

With reference to FIG. 15, that figure shows an underside of the holder (200). As can be seen, the underside of the holder (200) may incorporate various structural features (224) defining hollow portions, flexible portions, and rigid portions of the holder (200). Such structures may be advantageous in directing and controlling the flexibility of the holder (200) for insertion into a nautical cleat, reducing the weight and material cost of the holder (200), providing increased strength and rigidity to portions of the holder (200), and aiding in manufacturing of the holder (200) using various manufacturing methods.

Figure 13:
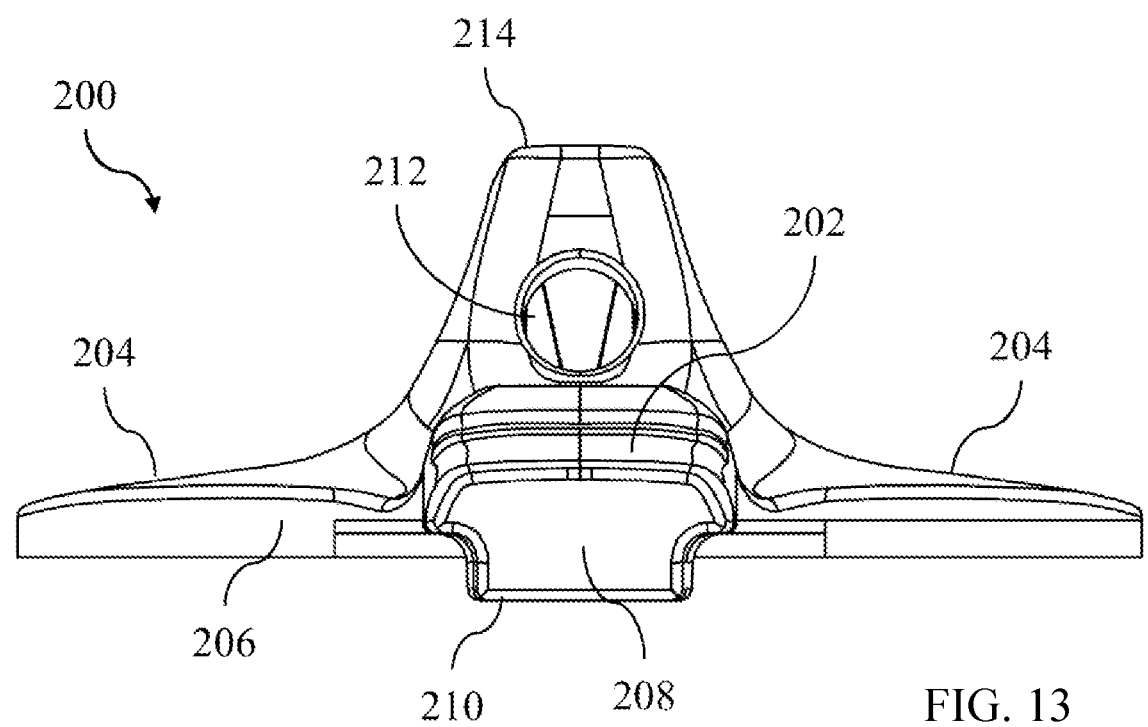
FIG. 13 is a front elevation view of the adjustable marine fender holder of FIG. 10.
Figure 14:
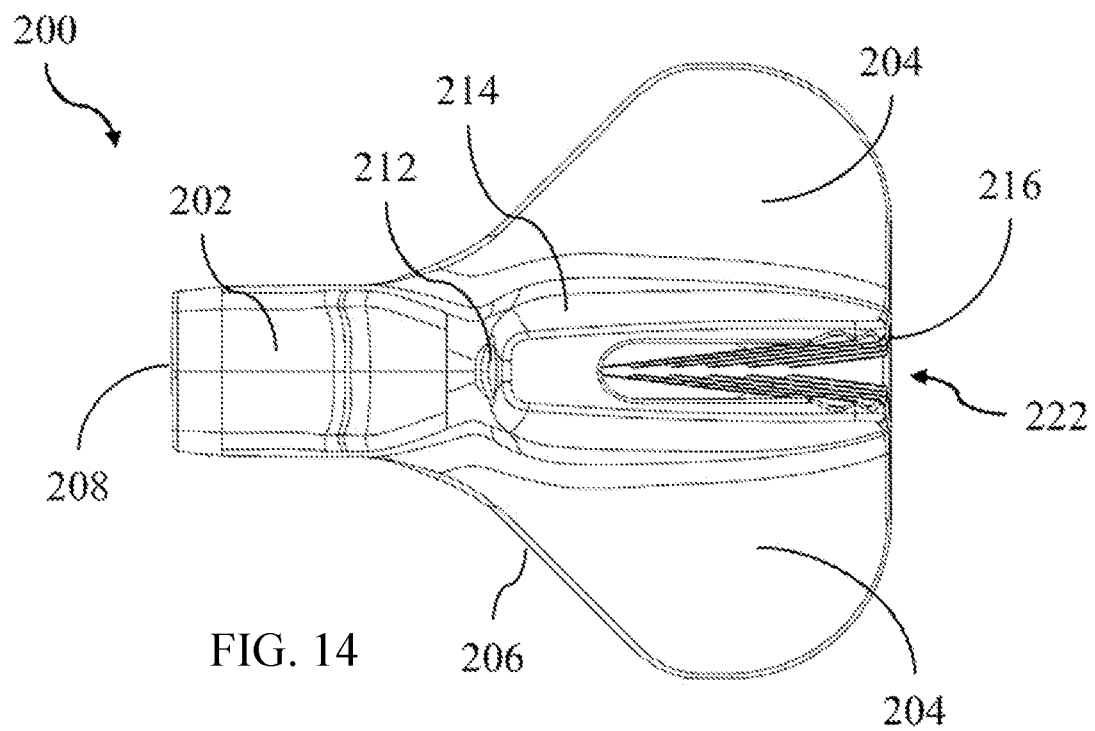
FIG. 14 is a top down view of the adjustable marine fender holder of FIG. 10.

FIG. 13 and FIG. 14 show other views of the holder (200) and characteristics described above. While the holder (200) as shown is advantageous in its simplicity, in that it can be produced as a single component having passive cleat and rope wedging or friction fit features, it should be understood that varying implementations of the holder (200) may include other passive or active features that may be advantageous for its use. As an example, this may include the application or inclusion of various surface materials or surface coatings on one or more portions of the holder (200) as has been described. This may also include mechanical adjustment features that may allow the holder (200) to be variably adjusted to change the size or height of the foot (210), the contour of the contoured edge (206), the wedge angle of the wedged arm (202), the diameter of the rope channel (222), and other aspects of the holder (200). In this manner, a highly adjustable holder (200) may be used with a variety of cleats after adjustment. While this may increase the cost and complexity of the holder, having a single holder that is compatible with a wide range of cleats may be more desirable for some implementations as compared to providing multiple holders with varying statically defined shapes, sizes, and other characteristics each of which is compatible with a narrower range of cleats.

Figure 16:
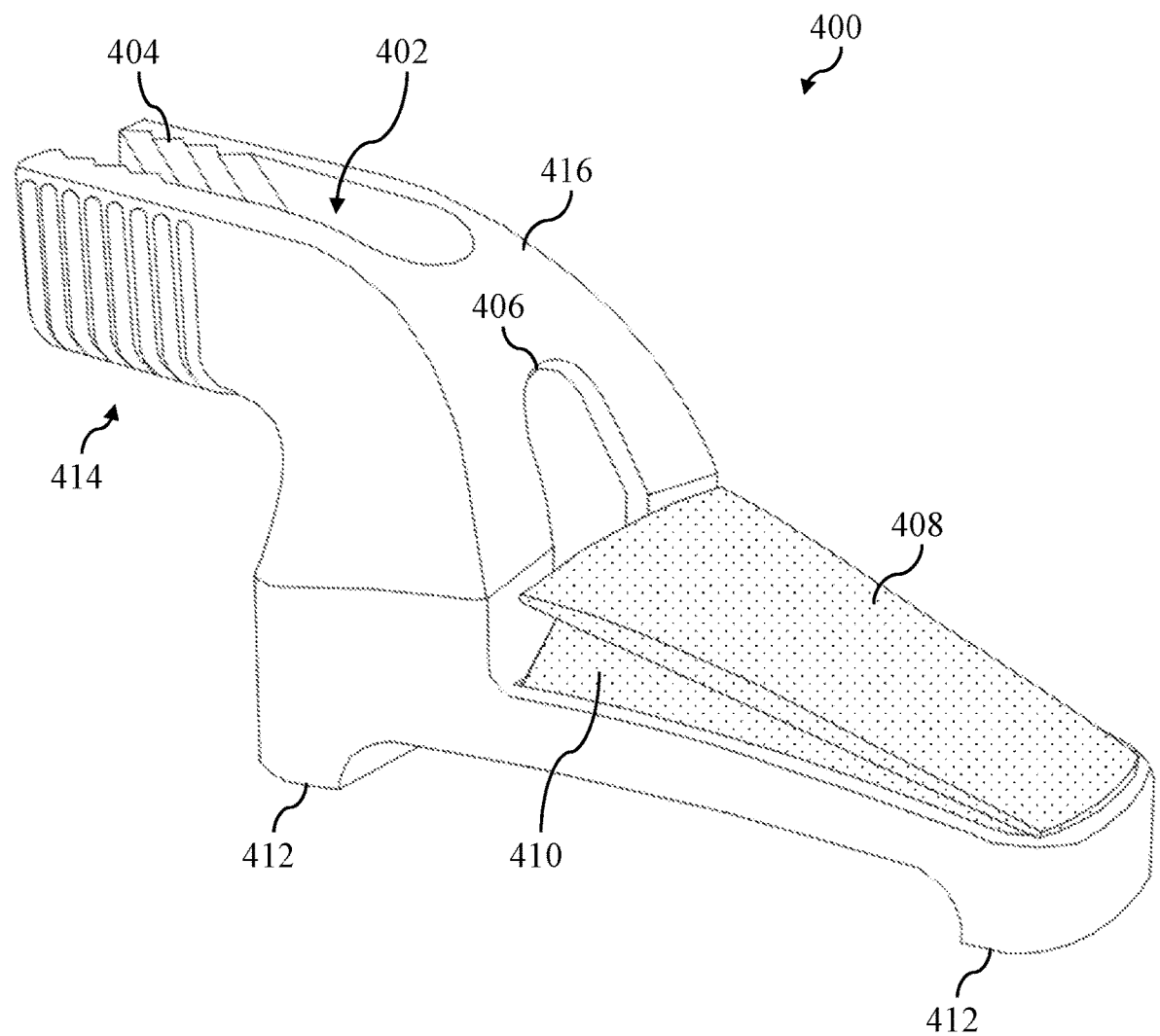
FIG. 16 is a front perspective view an adjustable marine fender holder with a collapsible friction pad.

FIG. 16 shows a front perspective view of another exemplary adjustable marine fender holder with a collapsible friction pad. The holder (400) includes many features that are the same or similar as those discussed above in the context of other holders (100, 200), including a body (416) (e.g., or an arm) that may be formed of materials such as those disclosed above, feet (412) that support the body (416) on a surface and allow the body (416) to flex at it is wedged into a cleat or other structure, a hole (406) through the body (416) which a rope may be passed through to define a rope channel (402), and a set of teeth (404) within the rope channel that grip a rope hold it in place when the rope is pulled or pushed into the teeth (404). The holder (400) also includes a grip feature (414) shown as a series of raised structures along the body (416) to aid in insertion and removal of the holder (400) from a cleat or other structure in which it has been wedged.

The holder (400) also includes a collapsible friction pad (408) that is fixed to the body (416) and positioned such that it contacts a cleat or other structure as the holder (400) is inserted. The collapsible friction pad (408) may be formed of plastic, foam, rubber, or other semi-flexible material that compresses under force. The collapsible friction pad (408) has an accordion structure which includes one or more gaps (410) between separate portions of the pad where no material is present, such that as the friction pad (408) is compressed the separate portions of material also collapse to fill the gaps (410). This advantageously allows the collapsible friction pad (408) to achieve a high force friction fit with a cleat, and also allows a top portion of the friction pad (408) to maintain contact along the entire surface area of the cleat as the friction as there are at least two sources of mechanical force maintaining the fit (e.g., the flexible bias of the pad back towards an original form where the gap (410) is not filled, and the flexible bias of the pad to return to an uncompressed state where it contacts the cleat).

As with prior examples, the holder (400) may be wedged into a cleat (e.g., with the teeth (404) located proximate the user and opposite the edge of the boat). A rope may be passed through the rope channel (406) after the holder (400) is coupled to the cleat, or prior, and once the length of rope extending from the hole (406) has been adjusted to a desired length the proximal end of the rope may be pulled downwards and wedged into the set of teeth (404) to hold the rope at the desired length.

Figure 17:
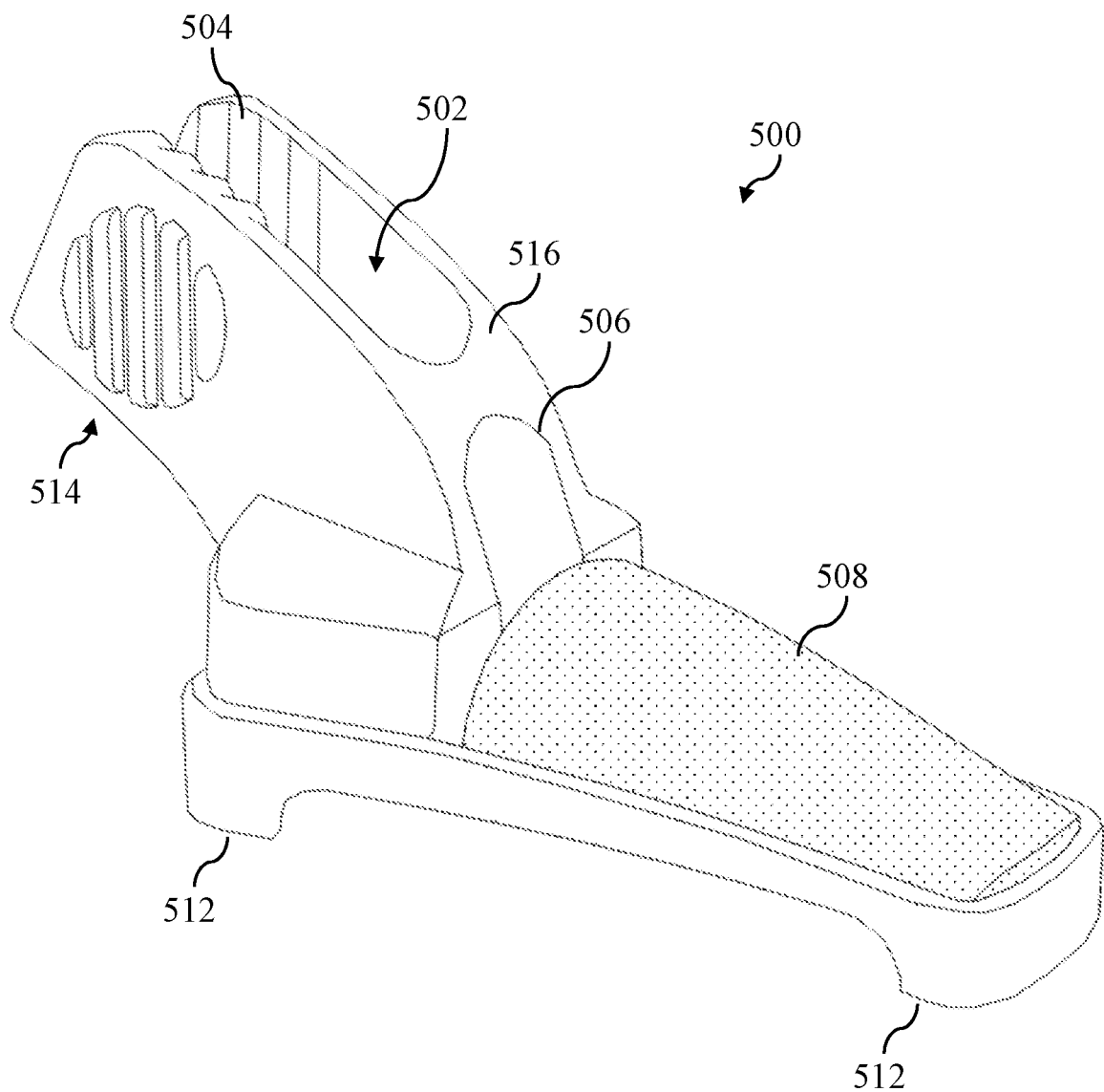
FIG. 17 is a front perspective view an adjustable marine fender holder with a compressible friction pad.

FIG. 17 shows a front perspective view of another exemplary adjustable marine fender holder with a compressible friction pad. The holder (500) includes many features that are the same or similar as those discussed above in the context of other holders (100, 200, 400), including a body (516) (e.g., or an arm) that may be formed of materials such as those disclosed above, feet (512) that support the body (516) on a surface and allow the body (516) to flex at it is wedged into a cleat or other structure, a hole (506) through the body (516) which a rope may be passed through to define a rope channel (502), and a set of teeth (504) within the rope channel that grip a rope hold it in place when the rope is pulled or pushed into the teeth (504). The holder (500) also includes a grip feature (514) shown as a series of raised structures along the body (516) to aid in insertion and removal of the holder (500) from a cleat or other structure in which it has been wedged.

The holder (500) also includes a compression pad (508) that is fixed to the body (516). The compression pad (508) may be made of plastic, foam, rubber, or other semi-flexible materials, and is positioned to compress and achieve a friction fit when the holder (500) is wedged into a cleat or other structure.

Figure 18A:
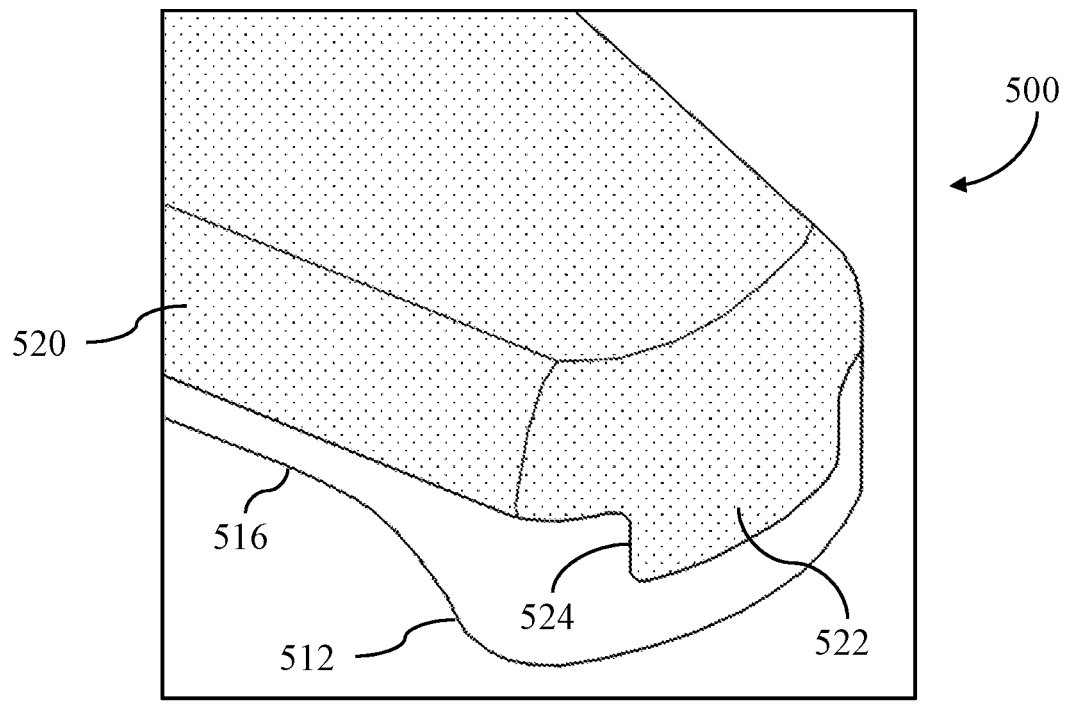
FIG. 18A is a front perspective view of an adjustable marine fender holder with an alternate compressible friction pad.
Figure 18B:
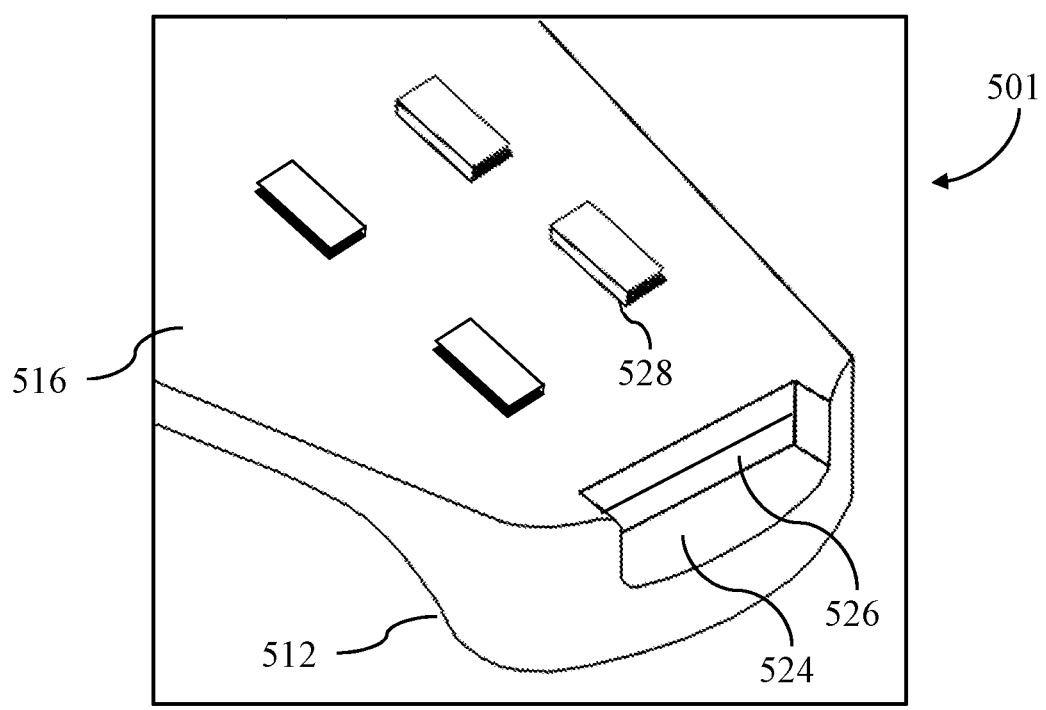
FIG. 18B is a front perspective view of the adjustable marine fender holder of FIG. 18A with the compressible friction pad removed.
Figure 18C:
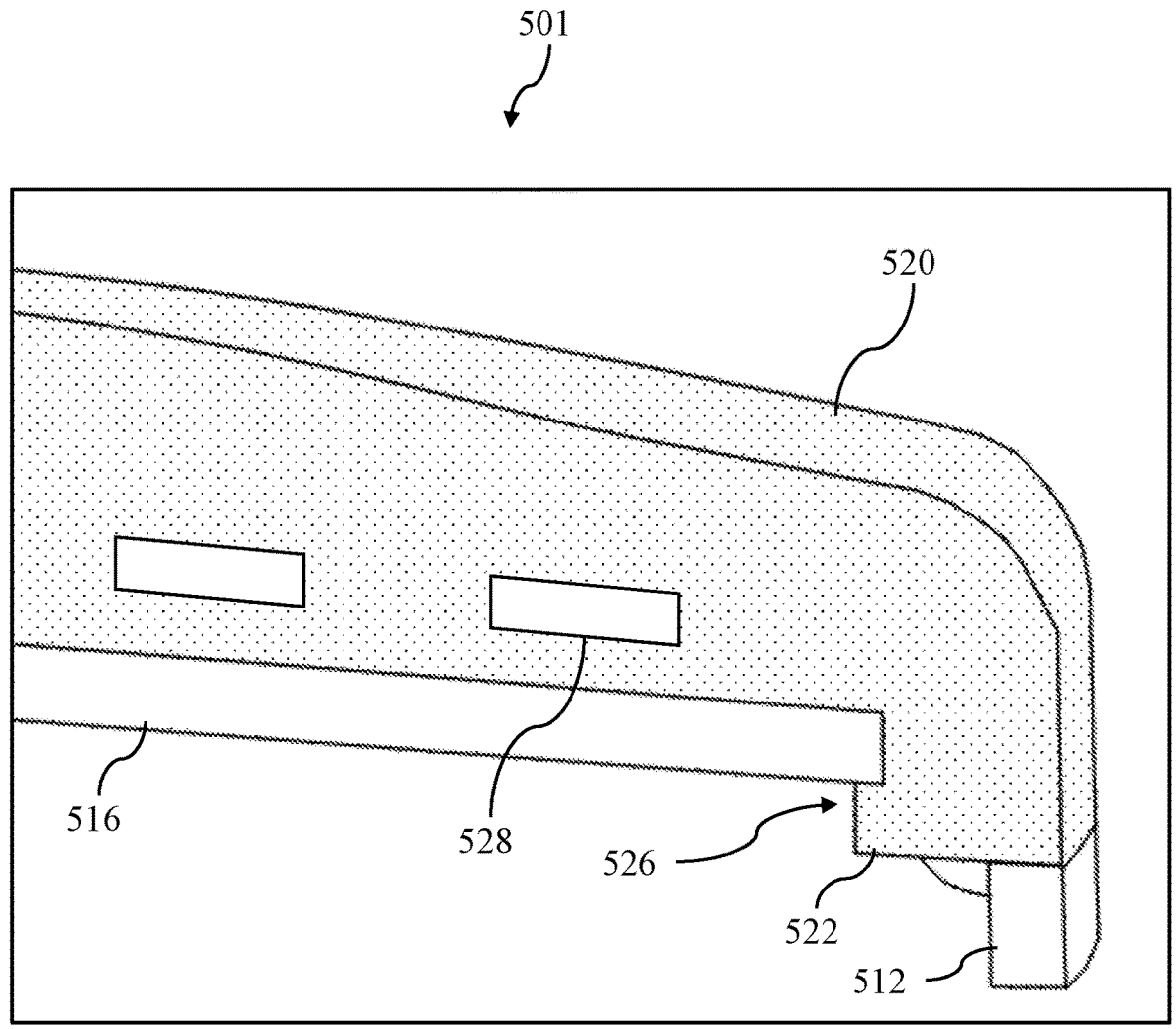
FIG. 18C is a cross-sectional view of the adjustable marine fender holder of FIG. 18A, showing the engagement of the compressible friction pad with the body of the holder.

With reference to FIGS. 16 and 17, the respective friction pads (408, 508) may be fixed to the respective bodies (416, 516) by adhesives, mechanical couplings (e.g., engagement of the underside of the pad with rigid rails, tabs, rims, or other structures of the body that hold the pad in place when engaged), or other means, or combinations thereof. FIGS. 18A-18C show further examples of friction pads and how certain implementation might be fixed to a holder. FIG. 18A shows a portion of a holder (501) that shares some features with the holder (500). The holder (500) includes a slot (524) in a front portion of the body (516) in which a tab portion (522) of a friction pad (520) fits when the friction pad is fixed to the body (516). The friction pad (520) may be formed of the same or similar materials as friction pads previously described, and may have the same or similar functions.

FIG. 18B shows the holder (501) with the friction pad (520) removed. The slot (524) can be seen defined within the body (516) of the holder (501), and an opening (526) can also be seen through the body (516) within the area of the slot (524). The opening (526) may receive a portion of the tab portion (522) of the friction pad as it is affixed to the body (516), as is more clearly shown in FIG. 18C. FIG. 18B also shows a set of tabs (528) which may fit within a longitudinal slit or opening within the bottom of the friction pad (520) as it is affixed to the body (516), and may further hold the friction pad (520) in place once installed, as is more clearly shown in FIG. 18C. Methods and structures for fixing a friction pad to the holder such as those described above may be further combined with adhesives, heat fusing processes, or other means to further aid in the durability of the fitment.

The friction pad shown in FIGS. 18A-18C is advantageous in that it provides a number of features that allow for a firm coupling to the body (516), as well as the ability to remove and replace the friction pad (520) if it degrades due to use, weather, sun exposure, or other factors. The friction pad (520) is also advantageous in that the tab portion (522) that engages with the body (516) is positioned beyond the point where the friction pad (520) will first engage a cleat as it is inserted during use. In this manner, the force against the friction pad (520) as it is wedged in will be received by the tab portion (522) in the same direction as the tab portion (522) is installed, ensuring that it will not be pulled free or otherwise decouple from the body (516) when the holder (501) is wedged into the cleat.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

The invention claimed is:

1. A marine fender holder comprising:
    (a) a body through which a rope channel passes, the rope channel comprising an opening at a first end and a rope fixture at a second end opposite the first end, wherein the rope fixture comprises a smooth portion through which a rope can freely slide, and a grip portion that a proximal end of the rope can be forced into so that a distal end of the rope that extends outwards from the opening is held at a fixed length; and
    (b) a cleat coupling that extends from the body and is configured to be pushed into a nautical cleat to couple with the nautical cleat and prevent movement of the marine fender holder, wherein the cleat coupling comprises: a single arm positioned to pass between two horizontal features of the nautical cleat when coupled with the nautical cleat; and a wedge of the single arm that is positioned to contact a horizontal feature of the nautical cleat when coupled with the nautical cleat and provide a friction fit.

2. The marine fender holder of claim 1, wherein the wedge comprises a foot at a distal end and a longitudinal flexible portion, wherein the longitudinal flexible portion flexes along its length when the friction fit is achieved.

3. The marine fender holder of claim 1, wherein the single arm and the wedge are a single piece formed of the same material.

4. The marine fender holder of claim 1, wherein the wedge comprises a friction pad that is coupled to the single arm and positioned to contact the horizontal feature of the nautical cleat and provide the friction fit.

5. The marine fender holder of claim 4, wherein the friction pad comprises a collapsible portion that collapses to fill a gap as the friction pad is compressed when the friction fit is achieved.

6. The marine fender holder of claim 4, wherein the single arm comprises a slot at its distal tip, and the friction pad comprises a tab portion that fills the slot when the friction pad is coupled to the single arm.

7. The marine fender holder of claim 6, wherein the slot defines an opening through the single arm that a portion of the tab portion passes through when the friction pad is coupled to the arm.

8. The marine fender holder of claim 4, wherein the single arm comprises a set of tabs positioned to engage with an underside of the friction pad and hold the friction pad in place against the single arm when the friction pad is coupled to the arm.

9. The marine fender holder of claim 1, wherein the grip portion comprises a set of opposing diagonal ridges that converge towards and meet at a bottom of the grip portion, wherein the set of opposing diagonal ridges are configured to provide a rope friction fit when the proximal end of the rope is pulled downwards towards the bottom of the grip portion.

10. The marine fender holder of claim 1, wherein the grip portion comprises a set of opposing vertical ridges that converge towards and meet at a bottom of the grip portion, wherein the set of opposing vertical ridges are configured to provide a rope friction fit when the proximal end of the rope is pulled downwards towards the bottom of the grip portion.

11. A method for positioning a marine fender comprising:
    (a) coupling a marine fender holder to a nautical cleat by pushing a cleat coupling of the marine fender holder into the nautical cleat to prevent movement of the marine fender holder, wherein the cleat coupling comprises: a single arm positioned to pass between two horizontal features of the nautical cleat when coupled with the nautical cleat, and a wedge of the single arm that is positioned to contact a horizontal feature of the nautical cleat when coupled with the nautical cleat and provide a friction fit;
    (b) passing a rope through a rope channel of the marine fender holder, the rope channel comprising an opening at a first end and a rope fixture at a second end opposite the first end, wherein the rope fixture comprises a smooth portion through which a rope can freely slide, and a grip portion;
    (c) adjusting a length of the rope that extends outwards from the opening to a desired length; and
    (d) forcing a proximal end of the rope into the grip portion to hold the rope in place and maintain the length at the desired length.

12. The method of claim 11, wherein the wedge comprises a friction pad that is coupled to the single arm and positioned to contact the horizontal feature of the nautical cleat and provide the friction fit.

13. The method of claim 12, wherein the friction pad comprises a collapsible portion that collapses to fill a gap as the friction pad is compressed when the friction fit is achieved.

14. The method of claim 12, wherein the single arm comprises a slot at its distal tip, and the friction pad comprises a tab portion that fills the slot when the friction pad is coupled to the single arm.

15. A marine fender holder comprising:
    (a) a body through which a rope channel passes, the rope channel comprising an opening at a first end and a rope fixture at a second end opposite the first end, wherein the rope fixture comprises a smooth portion through which a rope can freely slide, a grip portion, and a set of opposing ridges that converge towards and meet at a bottom of the grip portion, wherein the set of opposing ridges are configured to provide a rope friction fit when the proximal end of the rope is pulled downwards towards the bottom of the grip portion so that a distal end of the rope that extends outwards from the opening is held at a fixed length;
    (b) a cleat coupling that extends from the body and is configured to be pushed into a nautical cleat to couple with the nautical cleat and prevent movement of the marine fender holder, the cleat coupling comprising a single arm positioned to pass between two horizontal features of the nautical cleat when coupled with the nautical cleat; and
    (c) a friction pad that is coupled to the single arm and positioned to contact a horizontal feature of the nautical cleat and provide a friction fit.

* * * * *